United States Patent [19]

Makati et al.

[11] Patent Number: 5,236,991

[45] Date of Patent: Aug. 17, 1993

[54] IN-SITU TACKIFIED STRUCTURED LATEX COMPOSITION

[75] Inventors: Ashok C. Makati; Do I. Lee, both of Midland, Mich.

[73] Assignee: The Dow Chemical Company, Midland, Mich.

[21] Appl. No.: 366,206

[22] Filed: Jun. 12, 1989

Related U.S. Application Data

[63] Continuation of Ser. No. 3,355, Jan. 14, 1987, abandoned.

[51] Int. Cl.$^5$ ................................................ C08F 2/16
[52] U.S. Cl. .................................... 524/460; 524/458
[58] Field of Search ............................... 524/458, 460

[56] References Cited

U.S. PATENT DOCUMENTS

| | | |
|---|---|---|
| 4,134,872 | 1/1979 | Lee . |
| 4,145,494 | 3/1979 | Neubert . |
| 4,189,419 | 2/1980 | Takemoto et al. . |
| 4,237,257 | 12/1980 | Moriya et al. . |
| 4,325,856 | 4/1982 | Ishikawa et al. . |
| 4,419,481 | 12/1983 | Schwartz . |
| 4,445,959 | 5/1984 | Hombach et al. . |
| 4,478,974 | 10/1984 | Lee et al. . |
| 4,508,864 | 4/1985 | Lee . |
| 4,537,916 | 8/1985 | Bruschtein et al. . |
| 4,613,633 | 9/1986 | Sekiya et al. ..................... 524/460 |

FOREIGN PATENT DOCUMENTS

| | | |
|---|---|---|
| 40419 | 5/1981 | European Pat. Off. . |
| 2137212 | 10/1984 | United Kingdom . |

OTHER PUBLICATIONS

Emulsion Polymerization, Theory and Practice, D. C. Blackley, John Wiley, pp. 335-337 (1975).

*Primary Examiner*—Joseph L. Schofer
*Assistant Examiner*—Peter D. Mulcahy

[57] ABSTRACT

An in-situ tackified structured latex the particles of which have at least two polymeric phases, a first phase (adhesive phase) comprising a polymer having a Tg of from about −70° C. to about −5° C. and a second polymeric phase comprising a polymer compatable with the first polymeric phase, having a molecular weight less than 5,000 and a Tg from about −15° C. to about +50° C. The latex is particularly suited for use as a single component adhesive.

9 Claims, No Drawings

IN-SITU TACKIFIED STRUCTURED LATEX COMPOSITION

CROSS-REFERENCE TO RELATED APPLICATION

This is a continuation of application Ser. No. 003,355 filed Jan. 14, 1987, now abandoned.

BACKGROUND OF THE INVENTION

The present invention relates to a structured latex. More particularly, the present invention relates to such a structured latex that is particularly adapted for use in adhesive applications having one polymeric phase adapted to provide adhesive properties and another polymer phase adapted to provide tackifying properties. More particularly still, the present invention relates to such a structured latex wherein both the adhesive and tackifier phases are prepared by the emulsion polymerization of at least one of the phases in the presence of the second phase (in-situ tackifying).

Aqueous colloidal dispersions of polymers, which are referred to in the art as latexes, are generally known to be useful as components of adhesive formulations, as well as binders and coatings. A wide variety of adhesive formulations have been prepared that are specially adapted for particular uses. While latexes generally provide good adhesion to various substrates, it is often desirable to include a second component, generally a low molecular weight emulsified resin that is employed in order to impart initial stickiness or tack to the adhesive formulation. Such a component is referred to as a tackifier. Certain prior art adhesive formulations have included latex based adhesive components such as a latex of a styrene/butadiene copolymer, and conventional tackifiers such as rosin esters, or other suitable tackifiers, See, e.g., U.S. Pat. No. 4,189,419. The properties of the adhesive composition may be adjusted by appropriate selection of both the type and amounts of tackifier or adhesive component employed in order to provide a resulting composition having the desired properties.

However, such adhesive formulations have certain undesirable properties. For example, the process for dispersing the tackifying resin adds unnecessary complexity and additional cost to the formulation. In addition, such formulations often demonstrate insufficient coalescence between resin particles and latex particles thereby necessitating using excessive amounts of tackifier resin. This problem has been previously disclosed in U.S. Pat. No. 4,445,959. Also, because relatively high levels of surfactant are required to disperse the tackifying resin, adhesive properties are often detrimentally affected. Finally, under some conditions of high shear such as may be encountered during application of adhesives, these previously known adhesive formulations may lack sufficient stability.

As far as is known to the present inventors, it has previously been unknown to prepare, in a single latex composition, the desired combination of adhesion and tack properties to result in a suitable adhesive formulation, despite the obviously desirable processing and cost advantages to be gained from such a preparation. Attempts to prepare such a single latex composition have not previously succeeded due to the fundamentally opposite characteristics embodied in the adhesive phase and the tackifier phase of such latex. Generally, latexes which represent a compromise in adhesive and tackifier properties fail to possess adequate performance in either category. Consequently, previous attempts to prepare single component latex adhesive/tackifier compositions have proven unsatisfactory.

It would be desirable to provide a latex for use in preparing an adhesive formulation, especially a pressure sensitive adhesive, which does not require the additional presence of a conventional tackifier resin. It would, in addition, be desirable to provide such a composition which may be prepared entirely by emulsion polymerization techniques (in-situ tackified structured latex adhesive). Finally, it would be desirable to provide an in-situ tackified structured latex adhesive which possess performance as a pressure sensitive adhesive that is as good as or better than the performance of formulations containing latex adhesives and conventional tackifying resins.

Techniques are already known for the preparation of low molecular weight polymers via free-radical, emulsion polymerization processes. Typically, such techniques include initiation by organic peroxides or inorganic persulfate compounds, and the use of large quantities of a suitable chain transfer agent such as a halogen compound, a mercaptan compound, or the like, to limit growth of the polymer chains.

Structured latexes, also known as heterogeneous polymer latexes, or sequential emulsion polymerization latexes, have been previously described in U.S. Pat. Nos. 4,478,974; 4,537,916; 4,134,872; and 4,325,856. In such compositions, latex particles having domains exhibiting different properties such as "soft" and "hard" polymers, high strength or film forming properties, or hydrophobic and hydrophilic properties are prepared. The process used in the preparation of the above sequential emulsion polymerization is referred to as multistage emulsion polymerization.

For the teachings contained therein, the above-identified U.S. patents are hereby incorporated in their entirety by reference thereto.

SUMMARY OF THE INVENTION

According to the present invention there is now provided an in-situ tackified structured latex, the particles of which have at least two polymeric phases, the first polymeric phase (adhesive phase) comprising a polymer having a glass transition temperature, Tg, of from about $-70°$ C. to about $-5°$ C., and the second polymeric phase (tackifier phase) comprising a polymer compatible with the first polymeric phase and having a number average molecular weight less than 5,000 and a Tg from about $-15°$ C. to about $+50°$ C. The in-situ tackified structured latex of the invention is particularly useful as an adhesive and possesses qualities of both a latex adhesive and a tackifier. Accordingly, the in-situ tackified structured latex of the invention may be utilized as a laminating adhesive for preparing film to film, film to paper or other laminates, as a pressure sensitive adhesive to form adhesive tapes, or in other conventional adhesive applications.

DETAILED DESCRIPTION OF THE INVENTION

Suitable polymers or interpolymers for the adhesive phase of the present in-situ tackified structured latex include homopolymers of $C_{1-12}$ alkyl acrylates and methacrylates and copolymers thereof with ethylenically unsaturated comonomers and the well known random copolymers of vinyl aromatic monomers, ethylenically unsaturated nitriles or $C_{1-4}$ alkyl methacrylates with conjugated dienes, especially butadiene and isoprene. An optional polar monomer especially a carboxylic acid containing monomer may also be employed to increase the latex stability. Preferred adhesive phase polymers comprise interpolymers of styrene, butadiene and up to about 10 percent by weight of an unsaturated carboxylic acid. Preferred unsaturated carboxylic acids are acrylic, methacrylic and itaconic acids. Most preferred are such interpolymers comprising from about 45 to about 80 parts by weight butadiene, from about 55 to about 20 parts by weight styrene and from 1 to 5 parts unsaturated carboxylic acid, and having a Tg from −65° C. to −10° C.

Suitable polymers or interpolymers for the tackifier phase are comprised of those monomers previously mentioned in regards to the adhesive phase combined and polymerized so as to achieve the desired Tg and molecular weight. Preferred tackifier phase polymers comprise polymers of styrene and optionally butadiene and up to about 5 percent by weight of an unsaturated carboxylic acid. Preferred carboxylic acids and the previously mentioned acrylic, methacrylic and itaconic acids. Most preferred tackifier phase polymers comprise about 60 to about 90 parts by weight styrene, about 40 to about 10 parts by weight butadiene and from about 1 to about 5 parts by weight copolymerizable carboxylic acid, and having a Tg from about −10° C. to about +40° C.

When used herein and in the claims, the percentages of monomer content are based on total ethylenically unsaturated monomer content and exclude polymerized mercaptan. Glass transition temperatures used herein are determined by dynamic mechanical spectroscopy (DMS) or by Differential Scanning Calorimetry (DSC) at a rate of 10° C./min utilizing a duPont 1090 model or equivalent calorimeter. Moreover, as used herein, compatability may be said to exist if polymers upon mixing demonstrate a single Tg or a narrowing of the difference in Tg's compared to those of the respective individual polymers.

The in-situ tackified structured latex according to the present invention may be prepared by multi-stage emulsion polymerization techniques such as are disclosed in the previously mentioned U.S. Pat. No. 4,537,916. Suitably, a continuous multi-stage emulsion polymerization process is employed with a first monomer feed stream corresponding to the desired polymeric composition of the initial polymeric phase to be formed. Either the adhesive phase or the tackifier phase may be initially prepared. After substantial completion of the initial polymerization a monomer feed stream corresponding to the second polymeric phase is polymerized. A short period to allow complete reaction of the monomers or "cook down period" may be utilized between monomer additions. The process may be repeated one or more additional times if desired.

Desirably, the adhesive phase comprises from about 95 percent to about 30 percent of the invented in-situ tackified structured latex measured on a dry latex solids basis, while the tackifier phase comprises the remainder thereof. Due to the desired miscibility of the phases, the resulting composition is essentially homogeneous and uniform.

In a most preferred embodiment, the tackifier phase is prepared by emulsion polymerization of the appropriate monomers in the presence of a large quantity of chain transfer agent. By the term "large quantity" is meant a sufficient quantity of chain transfer agent to provide a latex of the resulting polymer having a number average molecular weight of less than about 5,000. As used herein, molecular weights are determined by the techniques of gel permeation chromatography or size exclusion chromatography. Preferred chain transfer agents are aliphatic mercaptans having from about 8 to about 20 carbon atoms in the aliphatic group. Preferably, the chain transfer agent is employed in an amount from about 1 percent to about 20 percent by weight based on reacted monomer weight. Most preferably, from about 5 percent to about 15 weight percent of the chain transfer agent is employed. A highly desirable chain transfer agent has been found to be tertiary dodecyl mercaptan. Most preferably, the molecular weight of the tackifier phase is from about 1,000 to about 4,000.

By comparison, a chain transfer agent, if employed at all in the preparation of the first polymeric phase, is generally present in an amount from about 0.01 to about 5.0 percent by weight.

As a general rule, significant improvement and compatability of the tackifier phase with the adhesive phase is obtained if both phases comprise random copolymers of styrene and butadiene, each with an optional minor amount of a copolymerizable carboxylic acid to provide stability to the resulting latex.

In other respects, the multi-stage emulsion process to prepare the present in-situ tackified structured latex employs standard techniques and procedures. Typically, a seed latex such as a very small particle size styrene or styrene/acrylic acid copolymer is employed in the initial polymerization to produce uniformly sized particles.

Two principle differences exist between the adhesive polymeric phase and tackifier polymeric phase. First, the monomers employed to prepare the adhesive phase are selected to provide a lower Tg in the resulting polymer than the tackifier phase. Secondly, the molecular weight of the adhesive polymeric phase is generally significantly greater than that of the tackifier polymeric phase and correspondingly the amount of mercaptan in the first polymeric phase is significantly less than in the second polymeric phase.

After preparation, the in-situ tackified structured latex may be formulated into the desired adhesive formulation by blending therewith conventional additives including plasticizers, surfactants, fillers, antioxidants, thixatropic aids, pigments, flow aids, antimicrobials, etc.

Having described the invention, the following examples are provided as further illustrative thereof and are not to be construed as limiting. Unless indicated otherwise, all measurements are based on weight.

EXAMPLE 1

Two Stage Polymerization Feed Charge Preparation

An in-situ tackified structured latex was prepared by multi-stage emulsion polymerization. The tackifier phase was prepared first followed by the in-situ polymerization of the adhesive phase. Accordingly, a monomer charge of tackifier monomers (charge a) was prepared comprising 23.4 parts styrene, 6.0 parts butadiene, 3.0 parts t-dodecyl mercaptan, and 0.9 parts carbon tetrachloride.

A second monomer charge (charge b) was prepared comprising 19.6 parts styrene, 49.0 parts butadiene, 1.57 parts of t-dodecyl mercaptan and 2.1 parts carbon tetrachloride.

An additional monomer charge (charge c) was prepared comprising 18.1 parts water, 2.0 parts itacatonic acid, and 0.14 parts sodium hydroxide.

Finally, an aqueous charge (charge d) comprising 22.5 parts water, 0.5 parts sodium dodecylbenzene sulfonate, and 0.7 part sodium per sulfate was prepared.

Polymerization Process

To a one gallon stainless steel reactor having an agitator, and several inlets for charge addition was added 57.7 parts water, 0.01 parts of a 1% solution of the trisodium salt of N-(hydroxyethyl)ethylenediamine triacetic acid chelant and 3.5 part of a 305 Angstrom number average diameter styrene/acrylic acid copolymer (96/4) seed latex.

The reactor was purged with nitrogen, agitated at 350 rpm and heated to 90° C. Monomer charge (a) was added to the reactor over a period of 117 minutes. After complete addition of monomer charge (a), charge (b) was added to reactor over a period of 273 minutes. Monomer charge (c) was added to the reactor, beginning fifteen minutes after the start of addition of monomer charge (a) for a total of 330 minutes. Charge (d) was added to reactor at a continuous rate during the entire time of charging the reactor (390 minutes). After charging the reactor, the mixture was retained at 90° C. with agitation under nitrogen for one hour.

Thereafter, the reactor was cooled and the reactor contents recovered as a 48 percent solids mixture. The product comprised 30 percent tackifier phase and 70 percent adhesive phase.

EXAMPLE 2

The reaction conditions of Example 1 were substantially repeated excepting that monomer charge (a) and (b) were added in reversed order. That is the adhesive phase polymer is first prepared followed by preparation of the tackifier phase in the presence of the adhesive phase. Monomer charge (c) is added beginning 15 minutes after initial addition of monomer charge (b) at a continuous rate for 330 minutes. Charge (d) is added at a continuous rate during the entire time for charging the reactor (390 minutes). Recovery of the latex is as in Example 1.

EXAMPLE 3—Three Stage Polymerization

The reaction conditions of Example 2 are substantially repeated excepting that monomer charge (b) is first divided into two equal portions. The polymerization is conducted by the staged polymerization of one half of the adhesive phase, then the tackifier phase and finally the remaining half of the adhesive phase. Monomer charges (c) and (d) are added as in Example 2. Recovery of the latex is as in Example 1.

Comparative

A conventional homogeneous carboxylated styrene/butadiene latex comprising only an adhesive phase and containing no in-situ tackifier portion was prepared by a continuous polymerization of a feed stream comprising 70 parts butadiene, 28 parts styrene, 2 parts itaconic acid, 2.25 t-dodecyl mercaptan and 3 parts carbon tetrachloride. Feed streams (c) and (d) and all other polymerization conditions were essentially equal to those of Example 1.

The resulting latex was recovered as in Example 1 to provide a 48 percent solids latex.

Adhesive Properties Testing

The adhesive properties the latexes of Examples 1-3 and the comparative latex were measured. Peel adhesion was determined according to pressure sensitive tape council (PSTC) test methods for measurement of peel adhesion. A tape with the candidate adhesive was applied to a stainless steel plate by application of relatively heavy pressure. Peel adhesion (180° peel adhesion) was then measured according to the previously mentioned test methods. The "Polyken" Probe Tack test was conducted according to ASTM-D-2979 standards using a Polyken probe tack tester supplied by Test Machine, Inc. The following conditions were employed.

Probe: 304 Stainless Steel; 0.5 cm diameter polished to f/o emery paper finish.
Dwell Time: 1 second
Contact Pressure: 100 gm/cm$^2$
Separation Speed: 1 cm/sec
Temperature: 22° C.
Relative Humidity: 50 percent Results of the above testing of adhesive properties are contained in Table I.

TABLE I

| Latex | 180° Peel Adhesion (lbs/inch) | Polyken Probe (gm/cm$^2$) |
|---|---|---|
| Example 1 | 1.6 | 998 |
| Example 2 | 2.8 | 844 |
| Example 3 | 2.9 | 866 |
| Comparative | 1.3 | 308 |

The above data indicates that in-situ tackified structured latexes according to the invention exhibit significantly higher peel adhesion and Polyken probe tack values than do similar latexes comprising only an adhesive phase.

Specific Substrate Adhesion

A non-corona treated polypropylene film substrate was placed on a solid support. Parallel strips of double-faced adhesive tape were laid approximately 8 inches apart. Latex was applied to the film between the rows of tape and leveled to leave a uniform film. Cheese cloth was laid on top of the film. The composite was allowed to dry for 24 hours and then conditioned for 16 hours at about 28° C. and 50 percent relative humidity. Strips 2.5 cm wide were cut in a direction perpendicular to the adhesive tape strips and tested for 180° peel adhesion using an Instron ® adhesion tester operating at 2"/min. Results are contained in Table II.

TABLE II

| Adhesive | Peel Adhesion (lbs/in/width) |
|---|---|
| Example 1 | 4.8 |
| Example 2 | 6.5 |
| Example 3 | 2.5 |
| Comparative | 1.0 |

The above results indicate improved peel adhesion to untreated polypropylene films of the in-situ tackified structured latex compared to a latex composition containing only an adhesive phase.

What is claimed is:

1. An in-situ tackified structured latex prepared by emulsion polymerization having at least two polymeric phases, a first polymeric phase (adhesive phase) comprising a polymer having a Tg of from about −70° C. to about −5° C., and a second polymeric phase (tackifier phase) comprising a polymer that is compatible with the first polymeric phase having a number average molecular weight less than 5,000 and a Tg from about −15° C. to abut +50° C. said first polymeric phase comprising from about 95 percent to 50 percent of the latex and the second polymeric phase comprising from about 5 percent to 50 percent of the latex, such percentages being measured on a dry weight basis.

2. A structured latex according to claim 1, wherein the first polymeric phase comprises from about 95 percent to about 30 percent of the latex and the second polymeric phase comprises from about 5 percent to about 70 percent of the latex, such percentages being measured on a dry weight basis.

3. An in-situ tackified structured latex according to claim 1, wherein the first polymeric phase is a random interpolymer comprising in polymerized form on a weight basis from about 45 to about 80 parts butadiene, about 55 to about 20 parts styrene, and from 1 to 5 parts of an ethylenically unsaturated carboxylic acid, and the second polymeric phase is a random interpolymer comprising in polymerized form on a weight basis from about 60 to about 90 parts styrene, from about 40 to about 10 parts butadiene, and from about 1 to about 5 parts of an ethylenically unsaturated carboxylic acid.

4. An in-situ tackified structured latex according to claim 1, wherein the second polymeric phase has a molecular weight from about 1,000 to about 4,000.

5. An in-situ tackified structured latex according to claim 1, wherein the second polymeric phase has a Tg from about −10° to about +40° C.

6. An in-situ tackified structured latex according to claim 1, wherein the first and second polymeric phases comprise interpolymers of styrene, butadiene and itaconic acid.

7. An in-situ tackified structured latex according to claim 1, wherein the first polymeric phase is prepared by emulsion polymerization thereof in the presence of a previously prepared emulsion polymerized particle comprising the second polymeric phase.

8. An in-situ tackified structured latex according to claim 1 having been prepared by multi-stage emulsion polymerization.

9. An adhesive composition comprising an in-situ tackified structured latex according to claim 1.

* * * * *

UNITED STATES PATENT AND TRADEMARK OFFICE
CERTIFICATE OF CORRECTION

PATENT NO. : 5,236,991
DATED : August 17, 1993
INVENTOR(S) : Ashok C. Makati and Do I. Lee It is certified that error appears in the above-identified patent and that said Letters Patent is hereby corrected as shown below:

Column 7, line 9, "abut" should correctly read --about--.

Signed and Sealed this

Twenty-eighth Day of June, 1994

Attest:

BRUCE LEHMAN

*Attesting Officer*          *Commissioner of Patents and Trademarks*